US008218963B2

(12) United States Patent
Adelsberger et al.

(10) Patent No.: US 8,218,963 B2
(45) Date of Patent: Jul. 10, 2012

(54) SPATIALLY ADAPTIVE PHOTOGRAPHIC FLASH UNIT

(75) Inventors: Rolf Adelsberger, Zürich (CH); Markus Gross, Uster (CH); Marc Levoy, Stanford, CA (US); Remo Ziegler, Uster (CH)

(73) Assignee: ETH Zuerich, Zurich (CH)

( * ) Notice: Subject to any disclaimer, the term of this patent is extended or adjusted under 35 U.S.C. 154(b) by 19 days.

(21) Appl. No.: 12/936,228

(22) PCT Filed: Feb. 4, 2009

(86) PCT No.: PCT/EP2009/051266
§ 371 (c)(1),
(2), (4) Date: Dec. 17, 2010

(87) PCT Pub. No.: WO2009/121650
PCT Pub. Date: Oct. 8, 2009

(65) Prior Publication Data
US 2011/0123183 A1    May 26, 2011

(30) Foreign Application Priority Data
Apr. 4, 2008 (EP) .................................. 08103380

(51) Int. Cl.
*G03B 15/03* (2006.01)
(52) U.S. Cl. .......................................... 396/164; 362/16
(58) Field of Classification Search ............... 396/164; 362/16
See application file for complete search history.

(56) References Cited

U.S. PATENT DOCUMENTS 6,278,542 B1 * 8/2001 Hewlett .................. 359/291
7,652,274 B2    1/2010 Wernersson 2001/0031143 A1   10/2001 Kamon et al.
2004/0170420 A1    9/2004 Fukui
2011/0050885 A1 *  3/2011 McEldowney ............. 348/135

FOREIGN PATENT DOCUMENTS
WO    2006082112 A1    8/2006

OTHER PUBLICATIONS

Schechner et al., "Multiplexing for Optimal Lighting", IEEE Transactions on Pattern Analysis and Machine Intelligence, vol. 29, No. 8, Aug. 2007, pp. 1339-1354.
Mohan et al., "Tabletop Computed Lighting for Practical Digital Photography" IEEE Transactions on Visualization and Computer Graphics, vol. 13, No. 4, Jul./Aug. 2007, pp. 652-662.
Debevec et al., "Acquiring the Reflectance Field of a Human Face" Computer Graphics, Siggraph 2000 Conference Proceedings, New Orleans, LA, Jul. 23-28, 2000, pp. 145-156.
Raskar et al., "Table-Top Spatially-Augmented Reality: Bringing Physical Models to Life with Projected Imagery", IEEE, 1999, pp. 64-71.
Raskar et al., "Spatially Augmented Reality", 1998, pp. 63-72.

* cited by examiner

*Primary Examiner* — W. B. Perkey
*Assistant Examiner* — Fang-Chi Chang
(74) *Attorney, Agent, or Firm* — Laurence A. Greenberg; Werner H. Stemer; Ralph E. Locher

(57) ABSTRACT

Using photographic flash for candid shots often results in an unevenly lit scene, in which objects in the back appear dark. A spatially adaptive photographic flash (100) is disclosed, in which the intensity of illumination (21, 23) varies depending on the depth and reflectivity (30, 101) of features in the scene. Adaption to changes in depth are used in a single-shot method. Adaption to changes in reflectivity are used in a multishot method. The single-shot method requires only a depth image (30), whereas the multi-shot method requires at least one color image (40) in addition to the depth data (30).

8 Claims, 3 Drawing Sheets

SPATIALLY ADAPTIVE PHOTOGRAPHIC FLASH UNIT

BACKGROUND OF THE INVENTION

Field of the Invention

The present invention relates to a photographic flash unit for illuminating objects to be captured by a camera. The flash unit comprises a lamp for emitting a flash, a lens, and a depth-camera for measuring distances per pixel to objects to be flashed and captured by the camera. The measured distances are represented by depth-data. The system further comprises a connection between the camera and the lamp for triggering a flash.

Digital cameras have become inexpensive, robust, and small. As a result, most consumers own one, carry it everywhere they go, and expect it to take good pictures under a variety of shooting conditions. To accommodate dark scenes, most digital cameras include electronic flash—either integrated with the camera or in a detachable unit. More expensive units offer control over brightness, duration, and angular spread. Regardless of how these parameters are chosen, flash illumination always falls off sharply with distance from the camera, making most flash pictures look unnatural. It is tempting to address this problem by capturing a flash-noflash image pair, estimating depth as the ratio of the flash and noflash images, then inversely scaling pixel intensities by this depth. However, separately scaling the intensities of individual pixels does not account for possible interreflections among the corresponding features in the scene. This can lead to physically invalid scenes, and hence to images that appear unnatural.

Graphics and vision researchers have long recognized the importance of controlling illumination in computational photography methods. These methods according to the kind of illumination they employ can be classified as follows:

i) Single Spatially Invariant Flash

Petschnigg et al. [Petschnigg et al. 2004] and Eisemann et al. [Eisemann and Durand 2004] take two images—one with flash and one without, then use the low noise of the flash image to reduce noise in the noflash image. For this purpose they employ a joint bilateral filter (a.k.a. cross-bilateral filter). However, using a spatially invariant flash on a scene with a large depth extent can lead to underexposed regions in the flash image. These dark regions are noisy, thereby diminishing the quality of the detail that can be transferred to the corresponding regions of the noflash image. Using our spatially varying flash, we can ameliorate this problem.

ii) Single Spatially Invariant Flash Using Multiple Shots

Several problems of flash images, such as strong highlights due to reflection of the flash by glossy surfaces, saturation of nearby objects, and poor illumination of distant objects are addressed by Agarwal et. al [Agrawal et al. 2005]. They capture a flash-noflash image pair, estimate depth as the ratio of the flash and noflash images, then inversely scale the gradients of each pixel in the flash image by this depth. The final image is computed by integrating this gradient field. However, separately scaling the intensities of individual pixels does not account for possible interreflections among features in the scene, as mentioned earlier. By contrast, our spatially adaptive flash applies different illumination along each ray. This produces a physically valid scene, and it requires capturing only one image rather than a pair of images.

iii) Programmable Illumination

Using a projector-like light source is a powerful alternative to spatially invariant flash illumination. Nayar et. al [Nayar et al. 2006b] show how a programmable flash can be used to separate an image into direct and indirect reflections. However, they cannot compute how these reflections would change if only a part of the scene were lit. This is a necessary capability if one wishes to reduce illumination on nearby objects. Mohan et al. [Mohan et al. 2007] presents an inexpensive method for acquiring high-quality photographic lighting of desktop-sized static objects such as museum artifacts. They take multiple pictures of the scene, while a moving-head spotlight is scanning the inside of a foam box enclosing the scene. This requires a controlled environment, which is typically not possible for candid shots. Other systems for programmatically controlled illumination include time-multiplexed lighting [Belhumeur 2007] and Paul Debevec's Light Stages [Debevec et al. 2000]. However, these methods are not suitable for candid photography.

iv) Dynamic Range

Many methods have been proposed for improving the dynamic range of an imaging system. These systems typically compromise either temporal or spatial resolution, or they employ multiple detectors. Nayar et. al [Nayar and Branzoi 2003] provide a good summary of previous work. They also present a way to enlarge the dynamic range of a system by adding a spatial light modulator (LCD) or DMD [Nayar et al. 2006a] to the optical path. This enables them to extend the dynamic range of the sensor by varying the exposure on a per-pixel basis. The invention presented here is complementary to this method. It permits us to attenuate light that is too bright, while also providing a way to add light to regions that would otherwise be too dark.

It is therefore, a task of this invention to provide a photographic flash unit for a camera allowing a control and a compensation of the flash illumination with the distance of the object as well as a compensation of the effects due to reflexions of the object to be photographed.

This task is solved by a photographic flash unit as claimed.

SUMMARY OF THE INVENTION

With
<<a connection of the depth-camera with a spatial light modulator,
   the spatial light modulator being arranged between the lamp and the lens,
   the spatial light modulator being structured into a plurality of pixels,
a transformation of depth-data, the depth-data containing a distance per pixel taken from the depth-camera, being displayed on the spatial light modulator in order to achieve per pixel a depth-dependent light adjustment of the flash emitted by the lamp>>;
   a flash unit is provided which allows an illumination of a scene with a variety of light sources, where each light source illuminates a part of the scene depending of the distance from the camera used for capturing a picture to that part of the scene.

The invention allows to be used in two different operation modes:
   single-shot operation;
   multi-shot operation.

In the single-shot operation, one single depth image is acquired, followed by a color image that captures the subject under spatially varying illumination. Since the depth image can be acquired during the focusing of the color camera, that is before the actual photograph, this is considered a <<single-shot method>>.

In the multi-shot operation, one depth image and at least one color image are captured. The color image can be used to refine the depth image. Furthermore, the color images can serve as pilot images, from which the brightness of each feature in the scene is estimated. This information is used to further refine the spatially varying illumination during a final color image acquisition.

The basic idea consists in changing the physical illumination of the scene on a per-pixel basis. The flash unit employs a rangefinder, e.g. an infrared time-of-flight device) to determine the distance to each object, a spatial light modulator SLM, e.g., an LCD-panel and a lense system—similar to a projector—to modulate the illumination. While this approach is limited by the power of the light source, the illumination it produces is physically plausible, as are the interreflections it triggers in the scene, so the images look natural.

Using such a flash unit it is possible to simulate a variety of virtual light sources. Unless the light source is a dramatic player in the scene, most photographers prefer sources that are diffuse, distant from the primary subject, and angled with respect to the direction of view. For interior shots, examples are ceiling lights or the sun passing through a side window. Since this spatially adaptive flash unit sits atop the camera, it cannot simulate lights that arrive from the side or above the subject. However, by modulating the illumination of each object as a function of its distance from the camera, it can simulate a light source located some distance behind the photographer. Illumination from such a source falls off quadratically with distance, but at a slower rate than from a flash unit mounted on the camera. In order to avoid unnatural shadows above the subject, the physical light source is mounted above the camera, as for conventional flash.

With the flash unit, only one snapshot is required by the main camera, preceded by a single capture using the rangefinder. For scenes in which flash provides the bulk of the illumination, a second problem is that highly reflective objects may saturate the sensor, especially if they lie close to the camera. By capturing an additional pilot image to estimate object reflectance's, the SLM can be controlled to reduce the illumination of these objects during the final image capture. One can treat this additional modulation as a sort of <<physical tone mapping>>—reducing the dynamic range of the scene by adjusting its illumination locally.

Projection displays have obtained popularity because of the smaller form-factor and larger size of screen. Among several types of projection displays, the ones using micro-Spatial Light Modulators SLMs are gaining recognition by consumers because of high performance of picture quality as well as lower cost than Flat Panel Displays. There are two types of a micro-SLM used for projection displays in the market. One is microLiquid Crystal Display (LCD) and the other is micro-mirror technology, some details see e.g. WO 2008/027230 A2. In the context of this invention the LCD-Technique represents a preferred solution. The invention is however not restricted to this LCD-Technique.

BRIEF DESCRIPTION OF THE SEVERAL VIEWS OF THE DRAWING

The working principle of the invention will now be described more in detail with reference to the accompanying drawings wherein.

DESCRIPTION OF THE INVENTION

Figure 1:
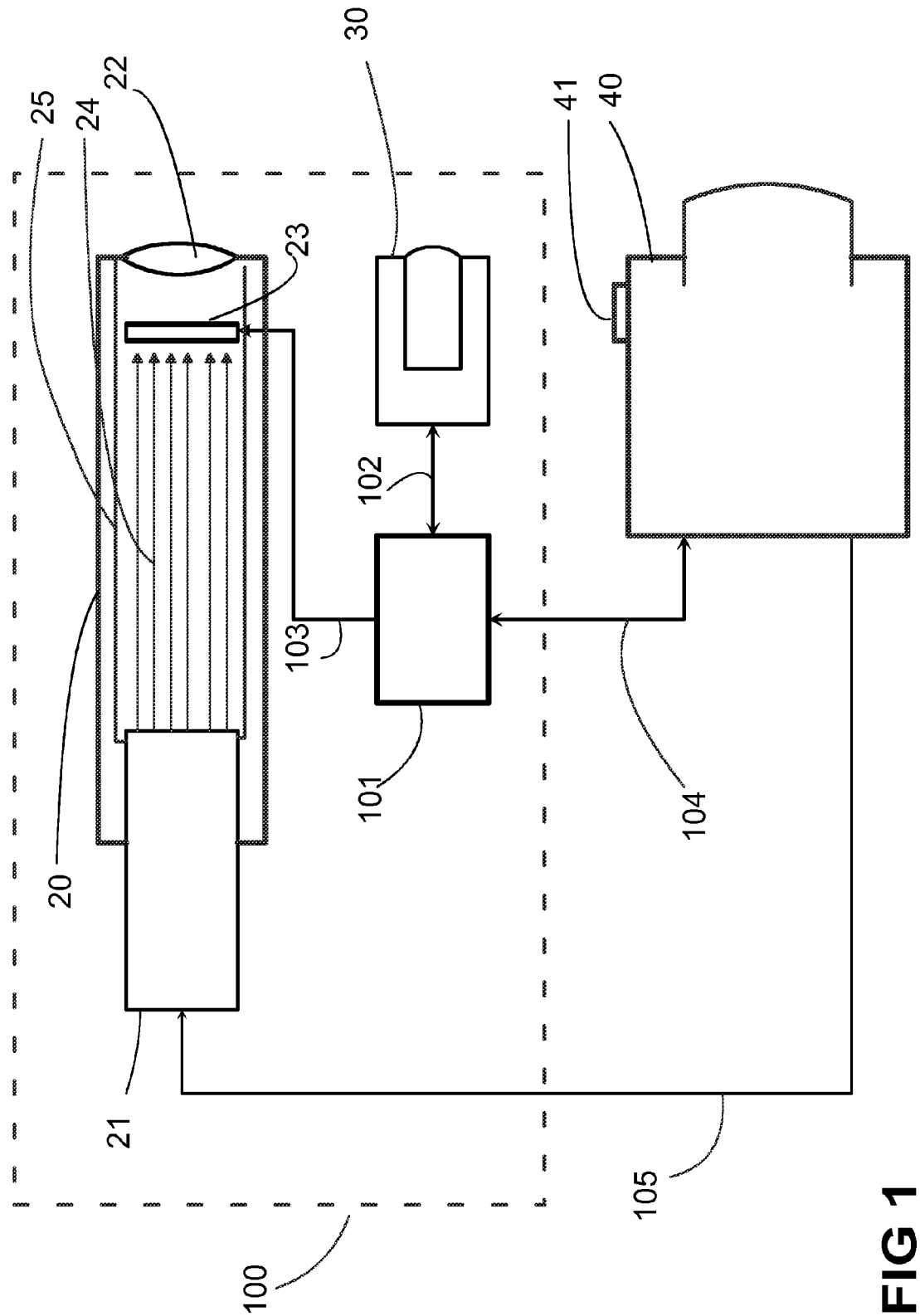
FIG. 1
Overview of the flash unit.

The setup consists of a Spatially Adaptive Flash Unit 100 as well as a color camera 40. In a standard setup the Spatially Adaptive Flash Unit 100 is positioned, such that the location roughly corresponds to a conventional flash unit mounted on the hot shoe of the color camera 40, cf. FIG. 1. This allocation of the different components has been chosen to get as close as possible to a candid shot setting. However, this setup with a wired communication 105 is not limited to this setting, since the Spatially Adaptive Flash Unit 100 could also be triggered—sometimes also called released—wirelessly from the camera 40. However, if the Spatially Adaptive Flash Unit <<SAFU>> 100 is not attached rigidly to the camera 40, the multi-shot approach—details see later on—would require recalibration each time either is moved.

Figure 2:
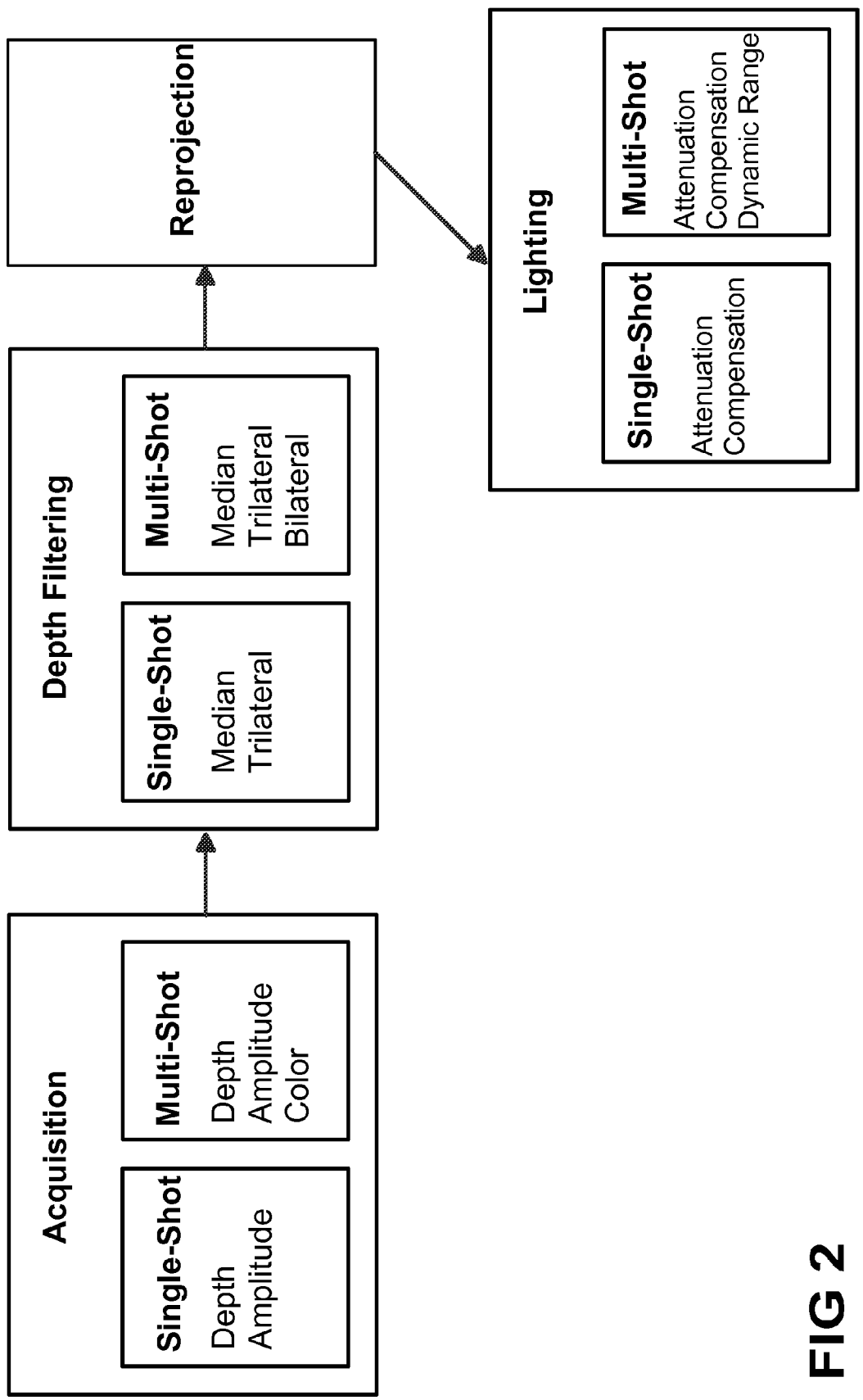
FIG. 2
steps of the single-shot-method and multishot-method.
Figure 3:
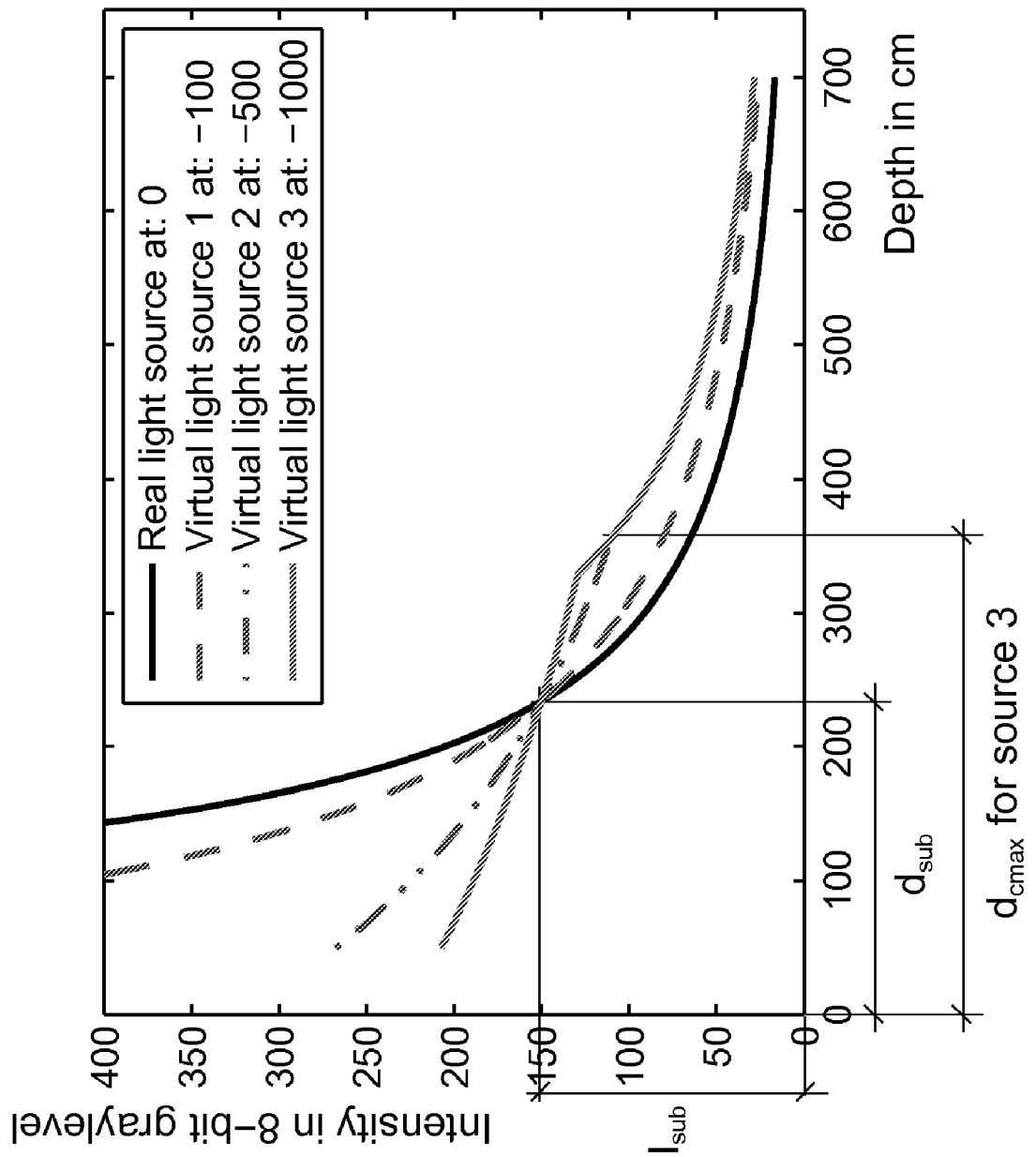
FIG. 3
diagram intensity vs. depth for a real and virtual light sources.

The Spatially Adaptive Flash Unit 100 consists of a projector 20 or a case 20 with lamp 21, a LCD panel 23 and a lens 22. The Spatially Adaptive Flash Unit 100 contains additionally a depth camera 30 based on time-of-flight (ToF) technology. The conceptual or procedural setup is shown in FIG. 2. For a concrete embodiment of the invention, the light bulb from a projector SANYO PLC-XW50 was removed and replaced by a Canon Speedlite 580EX II. In order to increase the intensity from the Spatially Adaptive Flash Unit 100, a mirrored tube 25 was built. This maximizes the light projected into the light path 24. The rest of the light path 24, including three LCD's 23, a lens 22, and the depth camera 30, are not modified. The alignment of the optical axis of the depth camera 30 and the optical axis of the lens 22 of the light are chosen to be as close as possible, in order to minimize the disparity between their views of the seen. the before mentioned tube was built in this embodiment, other embodiments are possible with such a tube 25.

A Swissranger ToF-camera 30 from Mesa-Imaging was employed. It has a resolution of 176×144 pixels, providing the depth and amplitude at a modulation frequency of 20 MHz. This allows for a depth range of 7.5 m without ambiguities. The ToF-camera 30 has a built in illumination source, which operates in the infrared spectrum of 850 nm. The accuracy is highly dependent on the reflected amplitude as well as on the background illumination. According to [Büttgen et al.] the best depth accuracy lies in the mm range. The captured depth maps partially suffer from substantial noise, which has to be filtered.

The color camera 40 is a Canon EOS 1D Mark III camera with a Canon EF 16-35 mm f/2.8 L USM lens. The camera 40 is either connected by USB bidirectionally to a Personal Computer (not shown in the Figures) or bidirectionally to a processing unit 101 with a communication connection 102. Using a Canon SDK all required settings of the camera 40 can be made.

The distortion, as well as the extrinsic and intrinsic matrices of the depth camera 30 and the color camera 40, are computed from six images of the printed checkerboard pattern. This method can be used for both types of cameras, since the checkers are also visible in the infrared spectrum of the depth camera 30. The case 20 is calibrated relative to the color camera 40 based on the method presented in [Shen and Meng 2002]. To increase the accuracy of the projector calibration, a novel checkerboard pattern of different color has been used. Instead of taking a black checkerboard pattern, which has to be covered or removed in order to recognize the projected one, a blue colored and printed checkerboard pattern was used, while projecting white for the first image. The same printed checkerboard pattern is used as a projection surface for the second image. The projected pattern is a standard black and white checkerboard pattern. The calibration pattern can be extracted from the red channel for the first image, while it is extracted from the blue channel for the second image. This modification has the advantage, that the plane of reference will be exactly the same for both images, leading to a better accuracy, and more simplicity than the previous approach.

It is important to note that this calibration has to be done only once, assuming the Spatially Adaptive Flash Unit 100 is mounted rigidly to the camera.

FIG. 2 shows the single-shot-method and multishot-method. Both methods can be split into four steps:
- acquisition,
- depth filtering,
- reprojection and
- lighting.

During the filter step, a median filter is applied to remove outliers in depths returned by the ToF-camera 30, and a novel trilateral filter is applied to reduce noise. The filtered depth data is then back projected, triangulated, and rendered into the case 20 view using graphics hardware. This step performs warping as resolves visibility in real-time. To cope with inaccuracies in calibration or depth values, a conservative depth discontinuity diffusion filter was applied. This filter gives depth values that are correct or slightly closer than the actual depth, thereby diminishing the visibility of possible misalignments. Next an attenuation mask is computed. This computation takes as input the filtered depths, the virtual light position, and a user defined artistic filter. This attenuation mask is loaded onto the LCD-Panel 23 of the Spatially Adaptive Flash Unit 100, and a final image is captured by triggering the flash unit 100 and camera to fire via the release 41.

The single-shot method permits compensation for the unnatural falloff of a conventional flash by virtually repositioning the light source 21 further back—behind the photographer. To simulate the falloff of such a light source 21, per-pixel depths are required. The time-of-flight camera 30 captures these depths at the same time the color camera is being aimed and focused. This method, where flash intensity is modulated based solely on depth, is called here as <<Single-shot flash adjustment>>. The <<Single-shot flash adjustment>> has the advantage of minimizing motion artifacts relative to methods that require multiple color images. However, variations in object reflectance cannot be taken into account by this method.

Assuming an already calibrated setup, The <<Single-shot flash adjustment>> can be split into the following steps, see also FIG. 2:
1. Acquisition of depth and amplitude (infrared);
2. Depth filtering;
3. Reprojection from the depth-camera to the flash unit;
4. Per pixel, depth-dependent light adjustment;
5. Color camera Capture.

The acquisition using the depth-camera 30 is straight forward, and therefore for the person skilled in the art not elaborated any further.

Depth Filtering

The captured depth data has a direct influence on the projected intensity per pixel. Noise in the depth data is, therefore, also visible as noise in the evaluated illumination. Since the human visual system is very sensitive to relative intensity variations, noise in the flash intensity becomes very easily visible. Although increasing the exposure time of the depth camera 30 improves the Signal Noise Ratio, it also increases motion blur artifacts. Therefore, the noise is reduced by applying different filters on the depth data allowing to keep a short exposure time.

Bilateral filtering [Tomasi and Manduchi 1998] has shown to perform well for filtering noise while preserving discontinuities in the signal. However, in order to remove the noise, the discontinuity of the signal always has to be higher than the noise level, which is not always the case when dealing with depth data from ToF-cameras. Eisemann and Durand [Eisemann and Durand 2004] and Petschnigg et al. [Petschnigg et al. 2004] introduced the cross bilateral filter—also known as joint bilateral filter—as a variant of the classical bilateral filter. They use a low noise image, meaning a high confidence in the high frequency data, as input to the range weight. This avoids smoothing across discontinuities of the signal. This approach has been extended to a Joint Adaptive Trilateral Filter, where the noise model of the depth values of the ToF-Camera 30 is taken into account for the confidence of the range weights. According to [Büttgen et al.], the standard deviation $\sigma_D$ of the depth data can be described as $$\sigma_D = \frac{c}{4\pi \cdot f_{mod}\sqrt{2}} \cdot \frac{\sqrt{B}}{c_{demod} \cdot A_{sig}}, \text{ with} \quad (1)$$

$$c_{demod} = \frac{A}{B}, \text{ and} \quad (2)$$

$$B = A_{sig} + BG, \quad (3)$$

where c is the speed of light, $f_{mod}$ is the modulation frequency, BG is the background illumination, $A_{sig}$ is the mean number of electrons generated by the signal, and A is the measured amplitude in electrons. Additional noise sources, such as thermal noise or dark current electrons are minimized by the camera and are neglected by this filter. Since c and $f_{mod}$ are constant and $c_{demod}$ can be approximated by 0.5 according to [Büttgen et al.], the standard deviation of the depth distribution is $$\sigma_D \approx \frac{k}{A_{sig}},$$

with $$k = \frac{c}{4\Pi \cdot f_{mod}\sqrt{2} \cdot 2}.$$

This relationship shows that $\sigma_D$, and therefore, the noise in the depth image, mainly depends on the amplitude.

Joint Adaptive Trilateral Filter

A joint adaptive trilateral filter has been introduced, which takes the amplitude dependent standard deviation σD of the depth values into account. The joint adaptive trilateral filter consists of a spatial proximity component g(•), a depth dependent component f(•) in the range domain and an amplitude dependent component h(•) in the range domain. The filtered depth value $d_m$ at position m can be described as:

$$d_m = \frac{1}{k_c} \sum_{i \in \Omega} d_i \cdot \underbrace{g(\|m - i\|)}_{spatial} \cdot \underbrace{f(d_m - d_1) \cdot h(a_m - a_i)}_{range} \quad (4)$$

$$k_c = \sum_{i \in \Omega} g(\|m - i\|) \cdot f(d_m - d_1) \cdot h(a_m - a_i) \quad (5)$$

where $a_m$ and $a_i$ are amplitude values at position m and i respectively. The three functions g(•), f(•) and h(•) are chosen to be Gaussian kernels, each with a kernel support of $\Omega$, and the corresponding standard deviations $\sigma_p$, $\sigma_d$ and $\sigma_a$ respectively.

Intuitively, the filter is smoothing the depth values, while limiting the influence at depth or amplitude discontinuities. However, since the noise is not uniformly distributed, we adapt σd and σa, and therefore, the influence of f(•) and h(•). Having a good approximation of the uncertainty measure of the depth values equation (1), the definition of two amplitude dependent functions $\sigma_d(\bullet)$ and $\sigma_a(\bullet)$ as follows:

$$\sigma_d(a_m) = \sigma_{d_{init}} \cdot \left(\frac{\tau_a}{a_m} + 1\right) \quad (6)$$

$$\sigma_a(a_m) = \frac{\sigma_{a_{init}} - \sigma_{a_{min}}}{1 + e^{-a_m + \tau_a}} + \sigma_{a_{min}}. \quad (7)$$

The initial standard deviation $\sigma_{d_{init}}$ is set to a low value, while the is set to a high value, dropping to $\sigma_{a_{min}}$ at $a_m = \tau_a$.

Median Filter

For very low amplitudes, the provided depth is very often an outlier. Although the joint adaptive trilateral filter would be able to remove such outliers, it would require several iterations to do so. Therefore, a median filter is applied, which removes the outliers in one step. To avoid unnecessarily blurring regions without outliers, the median filter has only two pixels with an amplitude below a threshold $\tau_m$. A threshold of $\tau_m = 40$ has shown to be a good value.

Mesh-Based Reprojection

To attenuate the light according to the depth values, they have to be transformed from the depth camera view to the projector view. In order to solve this reprojection step efficiently, a trivial triangular mesh is formed using all the back projected pixels from the depth camera and render them into the projector view. This provides a depth value per projector pixel and solves the visibility issue using the graphics card.

Artifacts can be introduced through resolution differences or remaining inaccuracies in the depth values. Since there is not more information to improve the accuracy of the data during the single-shot acquisition, the quality of the result is improved by moving the error to regions where it is least visible. Depth values that are too large produce visible artifacts, appearing as unexpectedly bright illumination. These artifacts are especially noticeable on objects close to the camera. Similarly, depth values that are too small produce unexpectedly dim illumination. Most of these artifacts appear at depth discontinuities. This means, that dim illumination due to too small depth values, will be adjacent to shadows produced by the flash and thus be less noticeable than the ones caused by too large depth values. Therefore, it is advantageous to err on the side of computing depth values that are either correct or too shallow. This is referred as the <<conservative approach>>.

Shallow Edge Diffusion

One possibility to improve the depth data in a sense as to comply with the <<conservative approach>>, is shallow edge diffusion. First all the big depth discontinuities are extracted using a Canny edge detector. Then, the obtained edges are simplified to a contour and every vertex of it is moved in the direction of its local gradient towards the region with the bigger depth values. The amount of translation corresponds to the multiplication of a globally defined width and the local gradient of the vertex before translation. By connecting the first and last vertex of the original and the moved contour, a set P of points lying inside the polygon is created. Finally, a modified bilateral filter is applied, cf Equation (8) to all the depth values $d_m$ lying inside of P, such that the depth edge is filtered and moved towards the region of bigger depth. The value $k_c$ is normalizing the weights of the depth values $d_i$. g(•) and $h_p(\bullet)$ are two Gaussian kernels defined on the support $\Omega_p$. $d_{i_{min}}$ corresponds to the shallowest depth value of the kernel support.

$$d_m = \frac{1}{k_c} \sum_{i \in \Omega_p} d_i \cdot g(\|m - i\|) \cdot h_p(\|d_{i_{min}} - d_i\|) \quad (8)$$

Depth Dependent Flash Adjustment

The intensity $I_0$ of an illumination source at distance 1 decreases with the distance d to an intensity of $$I_d = \frac{I_0}{d^2}.$$

This intensity falloff becomes visible in flash-photography and leads to unnaturally lit scenes. A light source positioned further behind the photographer, would result in a more homogeneously lit scene, which would appear more natural. Based on the depth values obtained from the previous step, a spatially dependent attenuation function can be evaluated, the more desirable light position as a virtual light source can be simulated. The photographer can choose two interdependent parameters, namely the position of the virtual light source along the optical axis of the Spatial Adaptive Flash Unit 100, and the minimal illumination for a specific subject of the scene. These preferences determine the depth compensation function leading to an attenuation per pixel.

The attenuation can in fact be interpreted as a filter by which the flash light is being modulated. It can also be used as artistic filters giving the photographer more creative freedom.

User Preferences

The parameters, which can be set by the user, are chosen based on the possible needs of the photographer. On the one hand, the photographer wants to pick the position of the light, and on the other hand, he wants to choose how much light is added to the subject of interest. The former can be set by providing the depth offset $d_{off}$ relative to the photographers position, with the positive axis lying in front of the photographer. The latter is defined by an intensity
$I_{sub} \in \{0, 1, 2, \ldots, 255\}$
of the flash at the depth corresponding to the focal length $d_{sub}$ of the camera. It is believed, that this is a natural way of parameterizing the virtual light source, since the photographer wants to primarily have control over how much light is added to the subject in focus. Especially for hand-held shots, the exposure time should not drop below a certain threshold to avoid motion blur due to camera shake. Of course, this method is not limited to this parameterization, but it is the one to be most useful for candid shot settings.

Depth Compensation Function

Given the final depth values and the user parameters (both see above), a depth compensation function $f_c(\bullet)$ can be defined as $$f_c(d_i) = \frac{I_{sub} \cdot (d_{sub} - d_{off})^2 \cdot d_i^2}{(d_i - d_{off})^2 \cdot d_{sub}^2} \quad (9)$$

$$f_{att}(d_i) = \begin{cases} I_{max} - f_c(d_i) & \text{if } f_c(d_i) < I_{max} \\ 0 & \text{if } f_c(d_i) \geq I_{max} \end{cases} \quad (10)$$

with $d_i$ being the depth value at the pixel with index i. $f_c(d_i)$ corresponds to the intensity that a pixel at index i requires to compensate for the position of the virtual light source. $f_{att}(\bullet)$ is the attenuation function dimming the maximal lamp power of the Spatially Adaptive Flash Unit 100 to result in a projection intensity of $f_c(\bullet)$. Since the compensation function is limited, a maximal compensation depth $d_{cmax}$ can be defined as $$d_{cmax} = \frac{-I_{max}d_{sub} - \sqrt{I_{max}I_{sub}(d_{sub}-d_{off})^2}}{I_{sub}d_{sub}^2 - 2I_{sub}d_{sub}d_{off} + I_{sub}d_{off}^2 - I_{max}d_{sub}^2} d_{off}d_{sub}, \quad (11)$$

where $I_{max}=f_c(d_{cmax})$. If $d_{cmax}$ is smaller than any depth in the scene, the system could notify the photographer about a possible underexposure and either recommend a lower $I_{sub}$ or a smaller offset $d_{off}$.

Artistic Filters

In addition to compensating for depth, one can also adapt the color balance to keep the lighting mood of the scene.

Multi-Shot Flash Adjustment

The <<single-shot flash adjustment>> is limited by a low resolution depth image, as well as a low resolution infrared amplitude image. Therefore, scenes featuring very fine detail might show artifacts due to wrong depth values. Furthermore, the lack of color information does not allow to correct for varying reflectance properties and overexposed regions automatically. To improve on these two limitations, a <<multi-shot flash adjustment>> is introduced. Since a color image has to be captured before taking the final shot with the corrected flash light, this is considered as a multi-shot approach. Assuming an already calibrated setup as for the <<single-shot flash adjustment>>, the <<multi-shot flash adjustment>> can be split into following steps, see also FIG. 2:

1 Acquisition of depth and amplitude (infrared), and two color images;

2 Depth filtering using high resolution color;

3 Reprojection from the up sampled depth-data to the flash unit;

4 Per pixel, depth-dependent light adjustment/reflectance correction;

5 Color camera capture.

Since most of the steps are very similar to the <<single-shot flash adjustment>> approach, the focus will be on the enhanced filtering and on the flash-tone-mapping as described in the following paragraphs.

Depth Filtering with Color

For reasons mentioned before, a good depth filtering is very important. Usage of the high-resolution color image allows to filter and up-sample the low resolution depth data, and therefore, get higher detail. Kopf et. al [Kopf et al. 2007] presented the joint bilateral up-sampling for images, where the mapping of corresponding areas between a low resolution image and a high resolution image is given. In the setup presented the depth data from the depth camera is mapped to the color camera by using the reprojection step described above. To improve the correspondences between the depth and the color values, the depth data is filtered according to the definitions given above prior to the mapping. As a result the trivially up-sampled depth data $\tilde{D}$ is obtained being of the same resolution as the color image $\tilde{I}$. To improve the performance of the filtering step, a technique motivated by the joint bilateral up sampling [Kopf et al. 2007] is applied.

$$\tilde{D}_m = \frac{1}{k_c} \sum_{p_{\downarrow\uparrow}\in\tilde{\Omega}_{\downarrow\uparrow}} \tilde{D}_{p_{\downarrow\uparrow}} \cdot \tilde{g}(\|m-p_{\downarrow\uparrow}\|) \cdot \tilde{h}_c(\|\tilde{I}_m - \tilde{I}_{p_{\downarrow\uparrow}}\|) \quad (12)$$

$$k_c = \sum_{p_{\downarrow\uparrow}\in\tilde{\Omega}_{\downarrow\uparrow}} \tilde{g}(\|m-p_{\downarrow\uparrow}\|) \cdot \tilde{h}_c(\|\tilde{I}_m - \tilde{I}_{p_{\downarrow\uparrow}}\|) \quad (13)$$

Instead of evaluating the full filter kernel, every $n^{th}$ pixel at position p on the filter kernel $\Omega$ is evaluated. n is the ratio between the width in pixels of the color camera, and the width in pixels of the depth camera, and for the height respectively. The closer the depth camera and the color camera are to a paraxial setting, the closer this approach is to the joint bilateral up-sampling. The function $\tilde{g}(\bullet)$ and $\tilde{h}_c(\bullet)$ are Gaussian kernels with a kernel support of $\tilde{\Omega}$. The color at position m is referred to as $\tilde{I}_m$.

Flash-Tone-Mapping

In the previous sections a method to adjust the amount of light per pixel depending on the per pixel depth value has been presented. However, the reflectance of the scene has not been taken into account. Regions of the scene, which were not lit before adding the flash light, might saturate when doing so. Therefore, not taking into account the reflectance, would not allow to compensate for this. Using a flash tone-mapping with a locally variable projection, which is motivated by the dodging-and-burning approach presented by Reinhard et. al in [Reinhard et al. 2002] is proposed in this invention.

The response curve of the camera without flash $g(z_i)$ and the maximum extent of the response curve with flash $g_F(z_i)$, can be defined as $$\text{Camera:}g(z_i)=\ln(E_i \cdot \Delta t) \quad (14)$$

$$\text{SAFU:}g_F(z_i)=\ln(\Delta t \cdot E_i + \Delta F_i) \quad (15)$$

The image pixel values $z_i$ are only dependent of the irradiance $E_i$ and the chosen exposure time $\Delta t$ for the camera response. $g(z_i)$ can be determined using a method presented by Debevec et. al [Debevec and Malik 1997]. Since the duration of the flash unit is usually much shorter than the exposure time, its response function $g_F(z_i)$ does not depend on the exposure time.

Depth Independent Range Extension

A new response curve $g_n(z_i)$ for the camera-flash system has to be found, which is similar to the response curve $g(z_i)$ of the camera, but extends the camera's dynamic range independently of per-pixel depth. Furthermore, the response curve shall avoid overexposure in the flash-lit image. $g_n(z_i)$ is bound by the lower bound $g_l(z_i)$ and the upper bound $g(z_i)$. The lower bound is determined as $$g_l(z_i)=\ln(\Delta t E_i + \Delta F_{i_{max}}) \quad (16)$$

$$=\ln(\Delta t E_i+\min(\Delta F_{xy}(z_i))), \text{ where} \quad (17)$$

$$\Delta F_{xy}(z_i)=e^{g(I'_{xy})}-e^{g(I_{xy})}, \forall xy \in I_{xy}. \quad (18)$$

The image pixels $I_{xy}$ of the no-flash image at position (x, y), and the image pixels of the flash image $I'_{xy}$ lie in the same range as $z_i$. The solution for $g_n(z_i)$ can now be approximated as a linear scaling of $g(z_i)$ by factor k, see Equation (19). $I_{xy}$ is the pixel value at coordinate x, y. $z_i$ is the intensity, which lies in the same range as the intensity values I. Therefore, $z_i$ is used to describe the transfer function. But the $z_i$ could anytime be exchanged by $I_{xy}$. complies with the lower bound $g_l(z_i)$. $g_n(z_i)$ could be smoothed slightly in order to avoid discontinuities in the fixed range. Given $g_n(z_i)$ the corresponding luminance contributed by the flash can be calculated as follows $$g_n(z_i) = k \cdot g(z_i) = \min\left(\frac{g_l(z_i)}{g(z_i)}\right) \cdot g(z_i). \quad (19)$$

The scaling factor $s_{xy}$ of the required light per pixel (x, y) of the Spatially Adaptive Flash Unit 100 can now be evaluated as $$s_{xy} = \frac{\Delta F_{i_{max}}}{\Delta F_{xy}}$$

with $$\Delta F_{i_{max}} = g_n(z_i) - g(z_i).$$

Assuming only direct light contribution by the case 20, the maximum intensity of the corresponding case pixel will be scaled by the scaling factor $s_{xy}$ as well.

LIST OF REFERENCE SIGNS, GLOSSARY

20 Case
21 lamp for emitting a flash, light source
22 lens
23 Spatial light modulator (SLM), e.g. LCD-panel
24 flash propagation inside the case; light path
25 mirrored tube
30 depth-camera for measuring distances, rangefinder
40 Camera, color camera of high resolution
41 Release, trigger
100 Photographic flash unit, SAFU
101 Processing unit (PU), processing unit containing an attenuation function
102 bi-directional communication connection from the processing unit to depth-camera
103 Control signal to SLM
104 bi-directional communication between processing unit and color sensor
105 (bi-directional) communication between color sensor and "flash"
SAFU Spatially adaptive flash unit, flash unit
ToF Time of Flight

LIST OF CITED DOCUMENTS

AGRAWAL, A., RASKAR, R., NAYAR, S. K., AND LI, Y. 2005. Removing photography artifacts using gradient projection and flash-exposure sampling. In SIGGRAPH '05: ACM SIGGRAPH 2005 Papers, ACM, New York, N.Y., USA, 828-835.

BELHUMEUR, P. N. 2007. Multiplexing for optimal lighting. IEEE Trans. Pattern Anal. Mach. Intell. 29, 8, 1339-1354. Member-Yoav Y. Schechner and Member-Shree K. Nayar.

B B., OGGIER, T., LEHMANN, R., AND LUSTENUTTGEN, M., KAUFMANN, BERGER, F. Ccd/cmos lock-in pixel for range imaging: Challenges, limitations and state-of-the-art.

DEBEVEC, P. E., AND MALIK, J. 1997. Recovering high dynamic range radiance maps from photographs. In SIGGRAPH '97: Proceedings of the 24th annual conference on Computer graphics and interactive techniques, ACM Press/Addison-Wesley Publishing Co., New York, N.Y., USA, 369-378.

DEBEVEC, P., HAWKINS, T., TCHOU, C., DUIKER, H.-P., SAROKIN, W., AND SAGAR, M. 2000. Acquiring the reflectance field of a human face. In SIGGRAPH '00: Proceedings of the 27th annual conference on Computer graphics and interactive techniques, ACM Press/Addison-Wesley Publishing Co., New York, N.Y., USA, 145-156.

EISEMANN, E., AND DURAND, F. 2004. Flash photography enhancement via intrinsic relighting.

KOPF, J., COHEN, M. F., LISCHINSKI, D., AND UYTTENDAELE, M. 2007. Joint bilateral up sampling. ACM Trans. Graph. 26, 3, 96.

LEVOY, M., CHEN, B., VAISH, V., HOROWITZ, M., MCDOWALL, I., AND BOLAS,

M. 2004. Synthetic aperture confocal imaging. ACM Trans. Graph. 23, 3, 825-834.

MOHAN, A., BAILEY, R. J., WAITE, J., TUMBLIN, J., GRIMM, C., AND BODENHEIMER, B. 2007. Tabletop computed lighting for practical digital photography. IEEE Trans. Vis. Comput. Graph. 13, 4, 652-662.

NAYAR, S. K., AND BRANZOI, V. 2003. Adaptive dynamic range imaging: Optical control of pixel exposures over space and time. iccv 02, 1168.

NAYAR, S. K., BRANZOI, V., AND BOULT, T. E. 2006. Programmable imaging: Towards a flexible camera. Int. J. Comput. Vision 70, 1, 7-22.

NAYAR, S. K., KRISHNAN, G., GROSSBERG, M. D., AND RASKAR, R. 2006. Fast separation of direct and global components of a scene using high frequency illumination. ACM Trans. Graph. 25, 3, 935-944.

PETSCHNIGG, G., SZELISKI, R., AGRAWALA, M., COHEN, M., HOPPE, H., AND TOYAMA, K. 2004. Digital photography with flash and no-flash image pairs. ACM Trans. Graph. 23, 3, 664-672.

RASKAR, R., WELCH, G., LOW, K.-L., AND BANDYOPADHYAY, D. 2001. Shader lamps: Animating real objects with image-based illumination. In Proceedings of the 12th Eurographics Workshop on Rendering Techniques, Springer-Verlag, London, UK, 89-102.

REINHARD, E., STARK, M., SHIRLEY, P., AND FERWERDA, J. 2002. Photographic tone reproduction for digital images. ACM Transactions on Graphics 21, 3 (July), 267-276.

RUSINKIEWICZ, S., HALL-HOLT, O., AND LEVOY, M. 2002. Real-time 3d model acquisition. In SIGGRAPH '02: Proceedings of the 29th annual conference on Computer graphics and interactive techniques, ACM, New York, N.Y., USA, 438-446.

SEN, P., CHEN, B., GARG, G., MARSCHNER, S. R., HOROWITZ, M., LEVOY, M., AND LENSCH, H. P. A. 2005. Dual photography. ACM Trans. Graph. 24, 3, 745-755.

SHEN, T.-S., AND MENQ, C.-H. 2002. Digital projector calibration for 3d active vision systems. Transactions of the ASME 124.

TOMASI, C., AND MANDUCHI, R. 1998. Bilateral filtering for gray and color images. In ICCV '98: Proceedings of the Sixth International Conference on Computer Vision, IEEE Computer Society, Washington, D.C., USA, 839.

ZHANG, L., CURLESS, B., HERTZMANN, A., AND SEITZ, S. M. 2003. Shape and motion under varying illumination: Unifying structure from motion, photometric stereo, and multi-view stereo. In ICCV '03: Proceedings of the Ninth IEEE International Conference on Computer Vision, IEEE Computer Society, Washington, D.C., USA, 618.

The invention claimed is:

1. A photographic flash unit for illuminating objects to be captured by a camera, the flash unit comprising:
   a lamp for emitting a flash;
   a lens;
   a depth-camera for measuring distances per pixel to an object to be flashed and captured by the camera, where measured distances are represented by depth-data;
   a connection between the camera and said lamp for triggering a flash;
   a spatial light modulator disposed between said lamp and said lens and connected to said depth-camera; and
   said spatial light modulator being structured into a plurality of pixels, and configured to display a transformation of the depth-data, the depth-data containing a distance per pixel taken from the depth-camera, the display achieving a per pixel depth-dependent light adjustment of the flash emitted by the lamp.

2. The flash unit according to claim 1, wherein said spatial light modulator is an LCD panel.

3. The flash unit according to claim 1, which comprises a processing unit connected between said depth-camera and said spatial light modulator, said processing unit containing a depth compensation function $f_c$ in order to evaluate a modulation dependent on a distance per pixel taken from said depth-camera.

4. The flash unit according to claim 3, wherein said processing unit further contains a filtering function $d_m$, where m represents at least one pixel, the filtering function $d_m$ being configured for eliminating noise in the depth-data.

5. The flash unit according to claim 4, wherein the filtering function $d_m$ is a median filter removing outliers in the depth-data returned by said depth camera.

6. The flash unit according to claim 3, wherein the depth compensation function $f_c$ being supplied with two interdependent parameters, being:
   a position of a virtual light source along an optical axis of the flash unit; and
   a minimal illumination of a specific subject of the scene to be photographed.

7. The flash unit according to claim 3, which comprises a connection between the camera and said processing unit, wherein said processing unit maps the depth-data to image-data captured by the camera to form mapped data, and said processing unit filters and transforms the mapped data, resulting in a modulation, and wherein the modulation is placed on said spatial light modulator before emitting a flash.

8. The flash unit according to claim 1, which comprises means allowing a rigid attachment of the camera to said flash unit.

* * * * *